(12) United States Patent
Sakurai et al.

(10) Patent No.: US 9,300,747 B2
(45) Date of Patent: Mar. 29, 2016

(54) SERVER

(71) Applicants: Kunihiko Sakurai, Gifu (JP); Norio Mizutani, Mie (JP)

(72) Inventors: Kunihiko Sakurai, Gifu (JP); Norio Mizutani, Mie (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 365 days.

(21) Appl. No.: 14/038,826

(22) Filed: Sep. 27, 2013

(65) Prior Publication Data

US 2014/0149394 A1    May 29, 2014

(30) Foreign Application Priority Data

Nov. 29, 2012  (JP) ................................. 2012-261689

(51) Int. Cl.
*G06F 3/12* (2006.01)
*H04L 29/08* (2006.01)

(52) U.S. Cl.
CPC ............ *H04L 67/2828* (2013.01); *G06F 3/122* (2013.01); *G06F 3/1247* (2013.01); *G06F 3/1288* (2013.01)

(58) Field of Classification Search
CPC ... H04L 67/2828; G06F 3/1288; G06F 3/122; G06F 3/1247

USPC ................ 358/1.13, 1.15, 1.16; 709/203, 246
See application file for complete search history.

(56) References Cited

U.S. PATENT DOCUMENTS

| | | | |
|---|---|---|---|
| 7,890,660 B2 * | 2/2011 | Suga | G06F 3/1213 709/203 |
| 8,994,995 B2 * | 3/2015 | Yamamoto | H04N 5/23229 358/1.14 |
| 2002/0016836 A1 | 2/2002 | Suzuki et al. | |

FOREIGN PATENT DOCUMENTS

JP         2002-014780 A      1/2002

* cited by examiner

*Primary Examiner* — Kent Yip
(74) *Attorney, Agent, or Firm* — Scully, Scott, Murphy & Presser, PC

(57) ABSTRACT

A server provides converted data to an external apparatus in response to plural request commands. The converted data is generated by converting target data and is divided to plural partial data to be stored in an external storage device. The server acquires one or more untransmitted partial data as a portion of the plural partial data from the external storage device each time when one request command is received, and writes the acquired one or more untransmitted partial data in an internal storage device of the server. The server transmits at least a portion of the one or more untransmitted partial data written in the internal storage device, to the external apparatus, each time when one request command of the plurality of request commands is received.

11 Claims, 10 Drawing Sheets

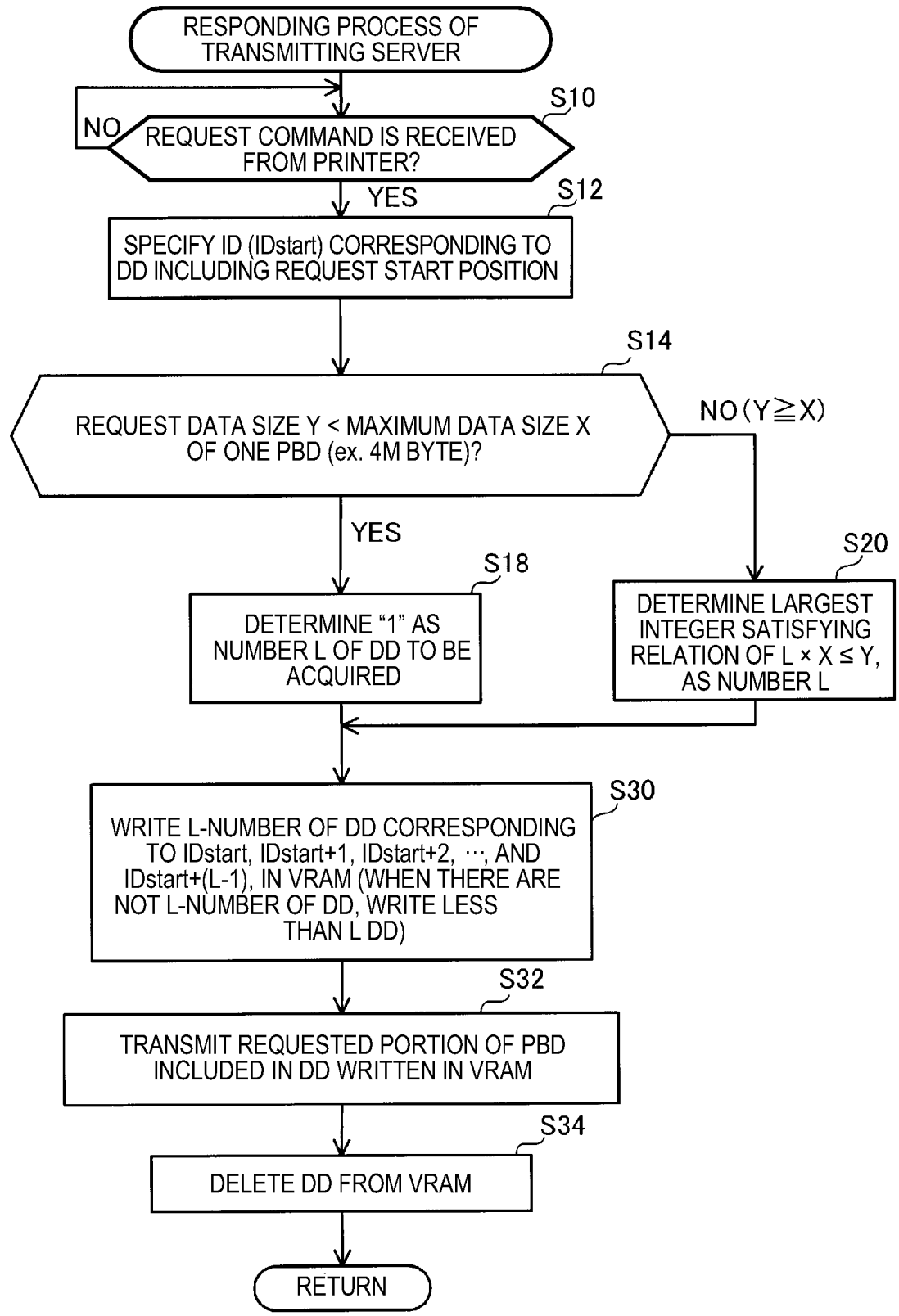

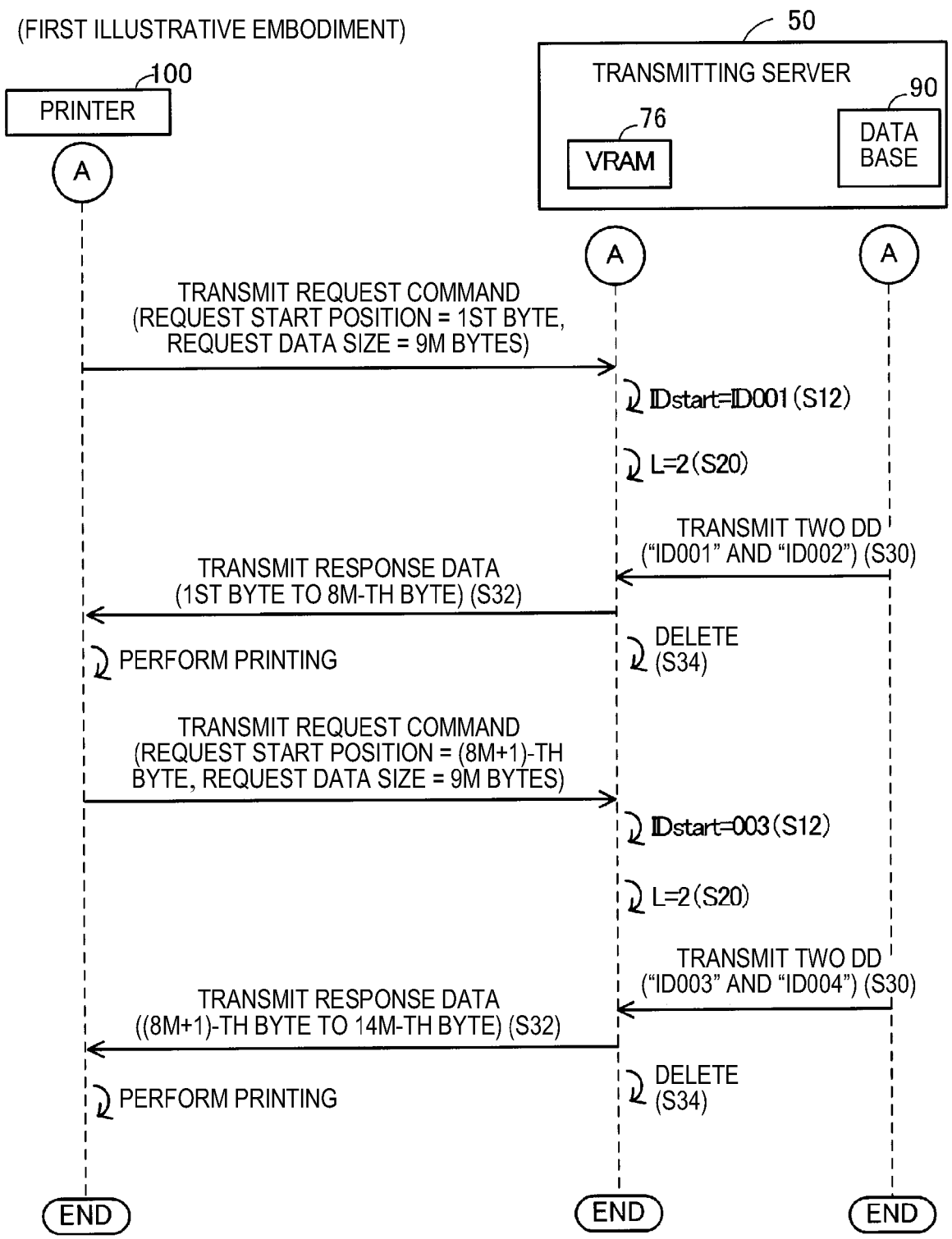

FIG. 5

(CASE A1)  CASE OF FIG. 4: X = 4MB, Y= 9MB

| NUMBER OF TIMES | REQUEST COMMAND | PARAMETERS | ACQUIRED DATA | RESPONSE DATA |
|---|---|---|---|---|
| 1 | START POSITION = 1<br>DATA SIZE = 9MB | IDstart=001<br>L=2 | ID001 1~4M<br>ID002 4M+1~8M | 1~8M |
| 2 | START POSITION = 8M+1<br>DATA SIZE = 9MB | IDstart=003<br>L=2 | ID003 8M+1~12M<br>ID004 12M+1~14M | 8M+1~14M |

(CASE A2)  X=4MB, Y=13MB

| NUMBER OF TIMES | REQUEST COMMAND | PARAMETERS | ACQUIRED DATA | RESPONSE DATA |
|---|---|---|---|---|
| 1 | START POSITION = 1<br>DATA SIZE = 13MB | IDstart=001<br>L=3 | ID001 1~4M<br>ID002 4M+1~8M<br>ID003 8M+1~12M | 1~12M |
| 2 | START POSITION = 12M+1<br>DATA SIZE = 9MB | IDstart=004<br>L=3 | ID004 12M+1~14M<br>WRITE LESS THAN L DD<br>(REFER TO S30 OF FIG. 3) | 12M+1~14M |

FIG. 6

(CASE A3)    X=4MB, Y=5MB

| NUMBER OF TIMES | REQUEST COMMAND | PARAMETERS | ACQUIRED DATA | RESPONSE DATA |
|---|---|---|---|---|
| 1 | START POSITION = 1<br>DATA SIZE = 5MB | IDstart=001<br>L=1 | ID001 \| 1~4M | 1~4M |
| 2 | START POSITION = 4M+1<br>DATA SIZE = 5MB | IDstart=002<br>L=1 | ID002 \| 4M+1~8M | 4M+1~8M |
| 3 | START POSITION = 8M+1<br>DATA SIZE = 5MB | IDstart=003<br>L=1 | ID003 \| 8M+1~12M | 8M+1~12M |
| 4 | START POSITION = 12M+1<br>DATA SIZE = 5MB | IDstart=004<br>L=1 | ID004 \| 12M+1~14M | 12M+1~14M |

(CASE A4)    X=4MB, Y=3MB

| NUMBER OF TIMES | REQUEST COMMAND | PARAMETERS | ACQUIRED DATA | RESPONSE DATA |
|---|---|---|---|---|
| 1 | START POSITION = 1<br>DATA SIZE = 3MB | IDstart=001<br>L=1 | ID001 \| 1~4M | 1~3M |
| 2 | START POSITION = 3M+1<br>DATA SIZE = 3MB | IDstart=001<br>L=1 | ID001 \| 1~4M | 3M+1~4M |
| 3 | START POSITION = 4M+1<br>DATA SIZE = 3MB | IDstart=002<br>L=1 | ID002 \| 4M+1~8M | 4M+1~7M |
| 4 | START POSITION = 7M+1<br>DATA SIZE = 3MB | IDstart=002<br>L=1 | ID002 \| 4M+1~8M | 7M+1~8M |
| 5 | START POSITION = 8M+1<br>DATA SIZE = 3MB | IDstart=003<br>L=1 | ID003 \| 8M+1~12M | 8M+1~11M |
| 6 | START POSITION = 11M+1<br>DATA SIZE = 3MB | IDstart=003<br>L=1 | ID003 \| 8M+1~12M | 11M+1~12M |
| 7 | START POSITION = 12M+1<br>DATA SIZE = 3MB | IDstart=004<br>L=1 | ID004 \| 12M+1~14M | 12M+1~14M |

FIG. 7

(COMPARATIVE EXAMPLE)

BD (14MB)

BD IS STORED IN UNDIVIDED STATE IN DATABASE 90

| NUMBER OF TIMES | REQUEST COMMAND | ACQUIRED DATA | RESPONSE DATA |
|---|---|---|---|
| 1 | START POSITION = 1<br>DATA SIZE = 5MB | BD (14MB) | 1~5M |
| 2 | START POSITION = 5M+1<br>DATA SIZE = 5MB | BD (14MB) | 5M+1~10M |
| 3 | START POSITION = 10M+1<br>DATA SIZE = 5MB | BD (14MB) | 10M+1~14M |

*FIG. 9*

(CASE B1)  X=4MB, Y=9MB

| NUMBER OF TIMES | REQUEST COMMAND | PARAMETERS | ACQUIRED DATA | RESPONSE DATA |
|---|---|---|---|---|
| 1 | START POSITION = 1<br>DATA SIZE = 9MB | IDstart=001<br>L=3 | ID001  1~4M<br>ID002  4M+1~8M<br>ID003  8M+1~12M | 1~9M |
| 2 | START POSITION = 9M+1<br>DATA SIZE = 9MB | IDstart=003<br>L=3 | ID003  8M+1~12M<br>ID004  12M+1~14M<br>WRITE LESS THAN L DD (REFER TO S70 OF FIG. 8) | 9M+1~14M |

FIG. 10

(CASE B2)    X=4MB, Y=5MB

| NUMBER OF TIMES | REQUEST COMMAND | PARAMETERS | ACQUIRED DATA | | RESPONSE DATA |
|---|---|---|---|---|---|
| 1 | START POSITION = 1<br>DATA SIZE = 5MB | IDstart=001<br>L=2 | ID001 | 1～4M | 1～5M |
| | | | ID002 | 4M+1～8M | |
| 2 | START POSITION = 5M+1<br>DATA SIZE = 5MB | IDstart=002<br>L=2 | ID002 | 4M+1～8M | 5M+1～10M |
| | | | ID003 | 8M+1～12M | |
| 3 | START POSITION = 10M+1<br>DATA SIZE = 5MB | IDstart=003<br>L=2 | ID003 | 8M+1～12M | 10M+1～14M |
| | | | ID004 | 12M+1～14M | |

(CASE B3)    X=4MB, Y=3MB

| NUMBER OF TIMES | REQUEST COMMAND | PARAMETERS | ACQUIRED DATA | | RESPONSE DATA |
|---|---|---|---|---|---|
| 1 | START POSITION = 1<br>DATA SIZE = 3MB | IDstart=001<br>L=1<br>(YES AT S58) | ID001 | 1～4M | 1～3M |
| 2 | START POSITION = 3M+1<br>DATA SIZE = 3MB | IDstart=001<br>L=2<br>(NO AT S58) | ID001 | 1～4M | 3M+1～6M |
| | | | ID002 | 4M+1～8M | |
| 3 | START POSITION = 6M+1<br>DATA SIZE = 3MB | IDstart=002<br>L=2<br>(NO AT S58) | ID002 | 4M+1～8M | 6M+1～9M |
| | | | ID003 | 8M+1～12M | |
| 4 | START POSITION = 9M+1<br>DATA SIZE = 3MB | IDstart=003<br>L=1<br>(YES AT S58) | ID003 | 8M+1～12M | 9M+1～12M |
| 5 | START POSITION = 12M+1<br>DATA SIZE = 3MB | IDstart=004<br>L=1<br>(YES AT S58) | ID004 | 12M+1～14M | 12M+1～14M |

SERVER

CROSS-REFERENCE TO RELATED APPLICATION

This application claims priority from Japanese Patent Application No. 2012-261689, filed on Nov. 29, 2012, the entire subject matter of which is incorporated herein by reference.

TECHNICAL FIELD

Aspects of the present invention relate to a server configured to transmit converted data to an external apparatus.

BACKGROUND

JP-A-2002-14780 discloses a system having a server apparatus and a printing apparatus. If a contents request is received from the printing apparatus, the server apparatus performs conversion on contents, thereby generating PML data. When receiving the above described request, the server apparatus further receives a size of a receiving buffer of the printing apparatus. According to the size of the receiving buffer, the server apparatus divides the PML data into a plurality of data. Then, the server apparatus sequentially transmits the plurality of data to the printing apparatus.

JP-A-2002-14780, however, does not disclose how the server apparatus uses an internal storage device of the server apparatus to transmit each divided data to the printing apparatus.

SUMMARY

Accordingly, an aspect of the present invention provides a technique capable of reducing a data amount to be written in an internal storage device of a server when the server transmits converted data to an external apparatus.

According to an illustrative embodiment of the present invention, there is provided a first server including a processor, and memory which stores a computer program. The computer program, when executed by the processor, causes the first server to perform: receiving a plurality of request commands from an external apparatus sequentially, wherein each of the plurality of request commands is a command for requesting the first server to transmit converted data which is data generated by converting target data according to one conversion instruction and which is divided into P-number (P is an integer of two or more) of partial data and stored in an external storage device, and wherein each of at least (P−1)-number of partial data of the P-number of partial data has a predetermined data size; and providing the converted data stored in the external storage device to the external apparatus in response to each of the plurality of request commands. The providing includes: writing one or more untransmitted partial data in an internal storage device of the first server by acquiring the one or more untransmitted partial data as a portion of the P-number of partial data from the external storage device each time when one request command of the plurality of request commands is received, wherein the untransmitted partial data is partial data including a portion, which has not been transmitted yet, of the P-number of partial data; and transmitting at least a portion of the one or more untransmitted partial data written in the internal storage device, to the external apparatus, each time when one request command of the plurality of request commands is received.

According to the above-described configuration, each time when one request command is received, the first server writes one or more untransmitted partial data which is a portion of P-number of partial data in the internal storage device, and transmits at least of a part of the one or more untransmitted partial data stored in the internal storage device, to the external apparatus. Therefore, as compared to a configuration in which all of the converted data is written in the internal storage device each time when one request command is received, it is possible to reduce a data amount to be written in the internal storage device.

A control method and a computer program for implementing the above-described first server and/or a second server, and a non-transitory computer-readable recording medium having the corresponding computer program stored therein are also new and useful.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIG. 3 is a flow chart illustrating a responding process of a transmitting server of a first illustrative embodiment;

FIG. 4 is a sequence diagram of the first illustrative embodiment followed by FIG. 2;

FIG. 5 is a view for explaining Case A1 and Case A2 which are implemented in the first illustrative embodiment;

FIG. 6 is a view for explaining Case A3 and Case A4 which are implemented in the first illustrative embodiment;

FIG. 7 is a view for explaining a comparative example;

FIG. 9 is a view for explaining Case B1 which is implemented in the second illustrative embodiment; and FIG. 10 is a view for explaining Case B2 and Case B3 which are implemented in the second illustrative embodiment.

DETAILED DESCRIPTION

First Illustrative Embodiment (Configuration of System)

Figure 1:
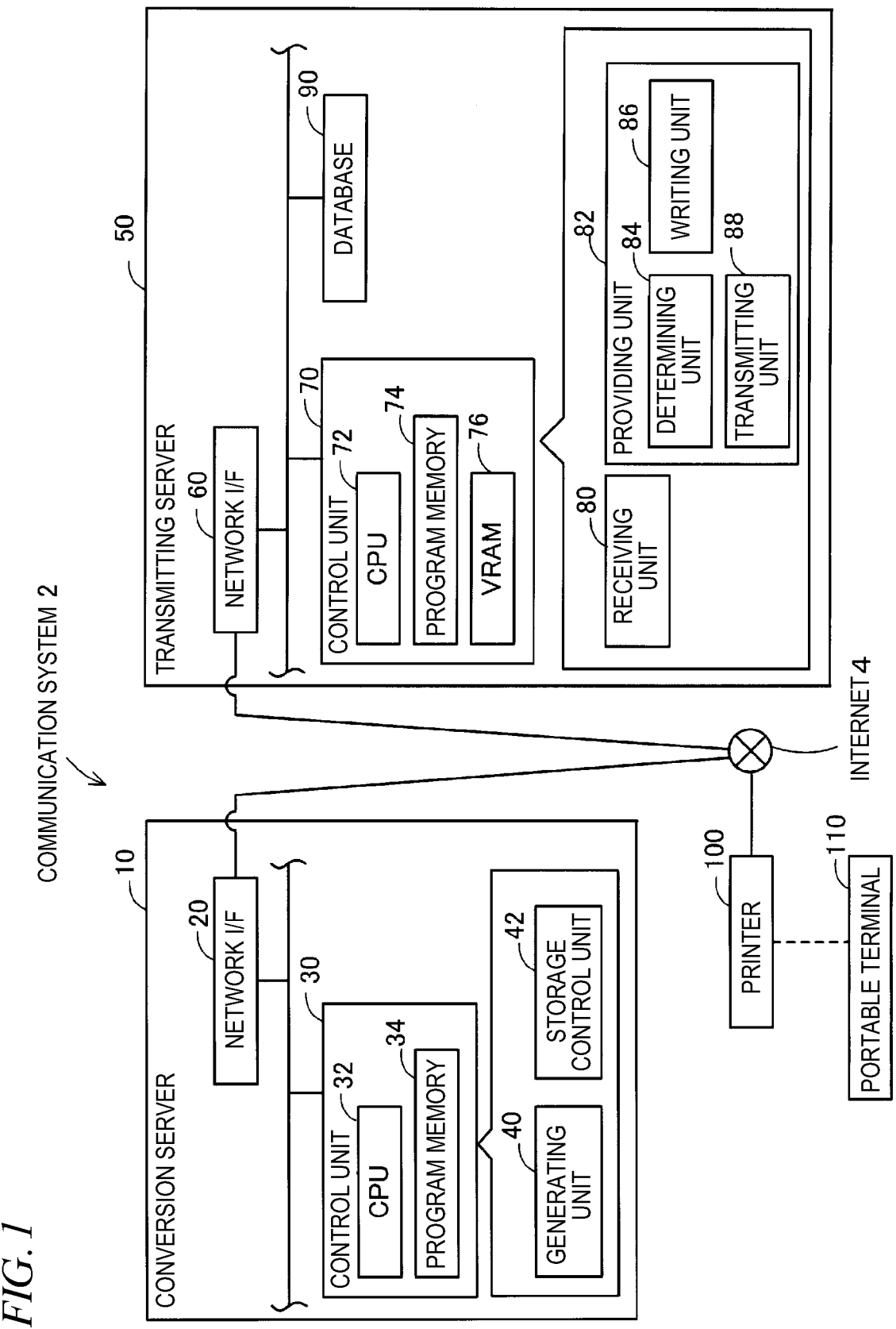
FIG. 1 is a view illustrating the configuration of a communication system.

As shown in FIG. 1, a communication system 2 includes a conversion server 10, a transmitting server 50, a printer 100, and a portable terminal 110. The conversion server 10, the transmitting server 50, and the printer 100 can perform a variety of data communication with one another through the Internet 4. Also, the printer 100 and the portable terminal 110 can perform, for example, wireless communication defined by the Wi-Fi Alliance, thereby performing a variety of data communication with each other.

(Configuration of Conversion Server 10)

The conversion server 10 is provided by a vendor of the printer 100. The conversion server 10 is a server for performing conversion on target data, that is, print data which the printer 100 cannot interpret, thereby generating converted data (binary data to be described below) which the printer 100 can interpret. The conversion server 10 includes a network interface 20 and a control unit 30.

The network interface 20 is a wired or wireless interface, and is connected to the Internet 4. The control unit 30 includes a CPU 32 and a program memory 34. The CPU 32 performs a variety of processes according to programs stored in the program memory 34. The CPU 32 performs processes according to the above described programs, whereby the functions of a generating unit 40 and a storage control unit 42 are implemented. Also, the above described programs include a program for converting, for example, portable document format (PDF) data into binary data.

(Configuration of Transmitting Server 50)

The transmitting server 50 is provided by the vendor of the printer 100. The transmitting server 50 is a server for storing converted data (that is, binary data) generated by the conversion server 10, and transmitting the converted data to the printer 100 in response to a request from the printer 100. The transmitting server 50 includes a network interface 60, a control unit 70, and a database 90.

The network interface 60 is a wired or wireless interface and is connected to the Internet 4. The control unit 70 includes a CPU 72, a program memory 74, and a volatile random access memory (VRAM) 76. The CPU 72 performs a variety of processes according to programs stored in the program memory 74. The CPU 72 performs processes according to the above described programs, whereby the functions of a receiving unit 80 and a providing unit 82 are implemented. Also, the providing unit 82 includes a determining unit 84, a writing unit 86, and a transmitting unit 88.

The VRAM 76 is a work memory in which a variety of data is written in a procedure in which the transmitting server 50 performs each process. The database 90 is a storage device for storing converted data (more specifically, a plurality of division data to be described below) generated by the conversion server 10. Also, in a case where it is necessary to transmit data stored in the database 90 to the outside (for example, the printer 100), the transmitting server 50 acquires the data from the database 90, and temporarily writes the data in the VRAM 76. Then, the transmitting server 50 can transmit the data stored in the VRAM 76 to the outside. In this way, the transmitting server 50 can transmit the data stored in the database 90 to the outside.

(Configuration of Printer 100)

The printer 100 has an inkjet or laser printing mechanism (not shown). The printer 100 has a program for converting joint photographic experts group (JPEG) data into binary data. That is, the printer 100 can interpret target data of JPEG. Therefore, in a case where target data is JPEG data, the printer 100 can perform conversion on the target data, thereby generating binary data representing ON or OFF of dots. The generated binary data is provided to the printing mechanism. Therefore, the printing mechanism can print images on printing media according to the binary data.

Meanwhile, the printer 100 does not have a program for interpreting PDF data. That is, the printer 100 cannot interpret target data of PDF. Therefore, in a case where target data is PDF data, the printer 100 cannot perform conversion on the target data, and thus cannot generate binary data. In this case, the printer 100 transmits the target data to the conversion server 10, and receives binary data from the transmitting server 50. Then, the received binary data is provided to the printing mechanism. Therefore, the printing mechanism can print images on printing media according to the binary data.

(Configuration of Portable Terminal 110)

The portable terminal 110 is a portable terminal apparatus such as a portable phone (for example, a smart phone), a PDA, a notebook PC, a tablet PC, a portable music player, or a portable video player. The portable terminal 110 performs wireless communication defined, for example, by the Wi-Fi Alliance, thereby transmitting target data to be printed, to the printer 100.

Figure 2:
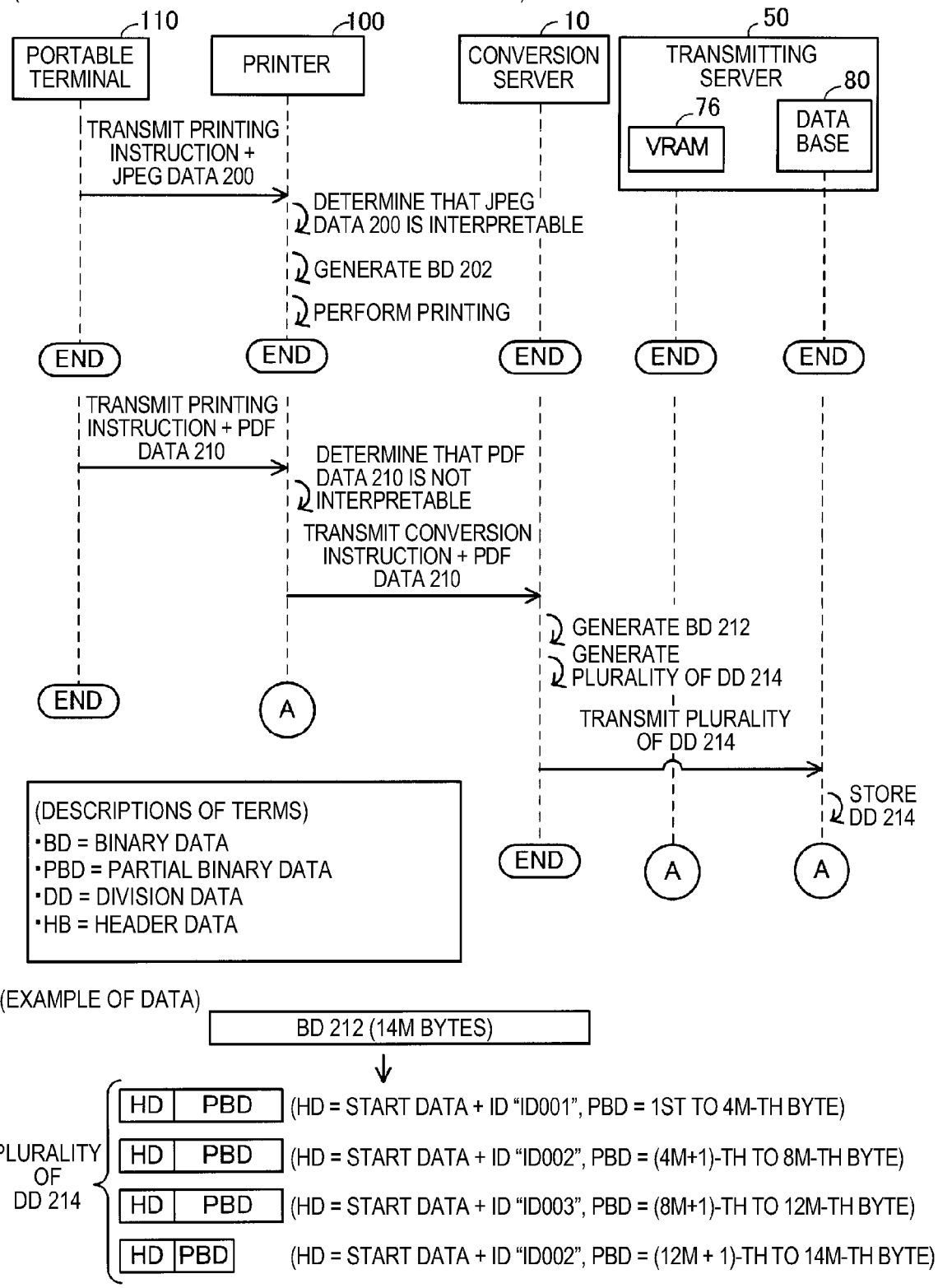
FIG. 2 is a sequence diagram illustrating processes which are performed by respective devices.

(Processes of Apparatuses: FIG. 2)

As shown in FIG. 2, for example, in response to an operation of a user, the portable terminal 110 transmits JPEG data 200 which is target data of JPEG and a printing instruction for instructing to perform printing according to the JPEG data 200, to the printer 100.

If the JPEG data 200 and the printing instruction are received from the portable terminal 110, the printer 100 determines that the JPEG data 200 is interpretable. In this case, the printer 100 performs conversion on the JPEG data 200, thereby generating binary data 202. Specifically, the printer 100 first converts the JPEG data 200 which is multi-leveled data of RGB (for example, 256 gray scales) into multi-leveled data of CMYK (for example, 256 gray scales). Next, the printer 100 performs some processes such as a halftone process on the multi-leveled data of CMYK, thereby generating binary data of CMYK (that is, data representing ON or OFF of dots). Hereinafter, binary data may be referred to simply as BD.

Next, the printer 100 prints images on printing media according to the generated binary data (BD) 202. As described above, in a case where the JPEG data 200 is received from the portable terminal 110, the printer 100 can perform printing without using the conversion server 10 and the transmitting server 50.

Meanwhile, for example, in response to an operation of the user, the portable terminal 110 transmits PDF data 210 which is target data of PDF and a printing instruction for instructing to perform printing according to the PDF data 210, to the printer 100.

If the PDF data 210 and the printing instruction are received from the portable terminal 110, the printer 100 determines that the PDF data 210 is not interpretable. In this case, the printer 100 transmits the PDF data 210 and a conversion instruction for instructing to perform conversion on the PDF data 210, to the conversion server 10. The conversion instruction includes the MAC address of the printer 100.

If the PDF data 210 and the conversion instruction are received from the printer 100, the generating unit 40 of the conversion server 10 performs conversion on the PDF data 210, thereby generating binary data 212. Specifically, the generating unit 40 converts the PDF data 210 generated in a page description language, into multi-leveled data of CMYK (for example, 256 gray scales). Next, the printer 100 performs some processes such as a halftone process on the multi-leveled data of CMYK, thereby generating binary data of CMYK.

Subsequently, the storage control unit 42 generates a plurality of division data 214 from the binary data 212. Each of the plurality of division data 214 includes a header data and a partial binary data. Hereinafter, division data, header data, and partial binary data may be referred to simply as DD, HD, and PBD, respectively.

A method of generating the plurality of division data (DD) 214 from the binary data (BD) 212 will be described with reference to an example shown in FIG. 2. The storage control unit 42 determines the first to 4M-th byte data of the binary data 212 of 14 M bytes, as a first partial binary data (PBD). Next, the storage control unit 42 determines "ID001" as an ID (that is, identification information) corresponding to the first partial binary data, and generates first header data (HD) including a start data representing start (that is, head) of a first division data, and the ID "ID001". Subsequently, the storage control unit 42 generates the first division data (DD) including the first header data and the first partial binary data.

Similarly, the storage control unit 42 subsequently generates a second division data and a third division data. The second header data of the second division data includes a start data and an ID "ID002". The second partial binary data of the second division data includes the (4M+1)-th byte to 8M-th byte data of the 14 M byte binary data 212. The third header data of the third division data includes a start data and an ID "ID003". The third partial binary data of the third division data includes the (8M+1)-th byte to 12M-th byte data of the 14 M byte binary data 212.

Finally, the storage control unit 42 generates a fourth division data. The fourth header data of the fourth division data includes a start data and an ID "ID004". The fourth partial binary data of the fourth division data includes the (12M+1)-th byte to 14M-th byte data of the 14 M byte binary data 212. That is, the fourth partial binary data include only 2 M byte data unlike the first to third partial binary data (that is, the each partial binary data of 4 M bytes).

As described above, the storage control unit 42 divides the binary data 212 having a data size of 14 M bytes in a predetermined division unit of 4 M bytes, and generates four partial binary data. If the total data size of the binary data 212 is an integer multiple of the above described division unit (that is, 4 M bytes), the data sizes of individual partial binary data are equal. However, in a case where the total data size (that is, 14 M bytes) of the binary data 212 is not an integer multiple of the above described division unit (that is, 4 M bytes), the data size (that is, 2 M bytes) of one partial binary data generated finally is smaller than the data sizes (that is, 4 M bytes) of the other partial binary data. That is, in a case where the number of partial binary data to be generated as the result of division is denoted by P (P is an integer of 2 or more), the storage control unit 42 divides the binary data 212 into P-number of partial binary data such that each of at least (P−1)-number of (for example, 3) partial binary data of the P-number of (for example, 4) partial binary data has a data size of 4 M bytes (the same data size). Incidentally, the division unit may be smaller than 4 M bytes, or may be larger than 4 M bytes.

As described above, with respect to the first division data, the second division data, and the third division data, the storage control unit 42 determines IDs such that numerical values increase in ascending order like "ID001", "ID002", . . . , "ID00P". Since the IDs corresponding to the individual division data are determined as described above, the transmitting server 50 can appropriately acquire each division data from the database 90 in Step S30 of FIG. 3 (to be described below).

Next, the storage control unit 42 provides the MAC address of the printer 100 included in the conversion instruction and the plurality of generated division data 214, to the transmitting server 50, such that the MAC address of the printer 100 and the plurality of division data 214 are stored in association with each other in the database 90 of the transmitting server 50. As described above, according to the present illustrative embodiment, in a case where one conversion instruction and the PDF data 210 are received from the printer 100, the conversion server 10 can appropriately store four partial binary data (more specifically, the four division data 214) obtained from the binary data 212, in the database 90.

In the present illustrative embodiment, since each of the plurality of division data 214 includes a start data and an ID, the transmitting server 50 can treat each division data 214 stored in the database 90, as one data. That is, the transmitting server 50 can acquire only one or more division data (for example, one division data) which is a part of the plurality of division data 214, from the database 90, and writes the one or more division data in the VRAM 76. In contrast to this, if the binary data 212 were stored in the database 90 without being divided, the transmitting server 50 could only acquire all binary data 212 from the database 90, and cannot acquire only a part of the binary data 212 and write the corresponding part in the VRAM 76. In the present illustrative embodiment, since the binary data 212 is stored in a divided state in the database 90, the transmitting server 50 can appropriately perform processes of FIG. 3 (to be described below).

As will be described below in detail (see FIG. 4), if the conversion instruction and the PDF data 210 are transmitted to the conversion server 10, the printer 100 sequentially transmits each of a plurality of request commands to the transmitting server 50. Each of the plurality of request commands is a command for requesting the transmitting server 50 to transmit the binary data 212. In response to each of the plurality of request commands, the transmitting server 50 sequentially acquires each division data from the database 90, and sequentially writes each division data in the VRAM 76. Next, the transmitting server 50 uses the division data sequentially written in the VRAM 76, to sequentially transmit the partial binary data to the printer 100. As a result, the printer 100 can receive all of the binary data 212 from the transmitting server 50, and can perform printing according to the binary data 212. The contents of a flow chart for the transmitting server 50 to perform that process will be described with reference to FIG. 3.

(Responding Process of Transmitting Server 50 Shown in FIG. 3)

Hereinafter, assuming a situation in which the plurality of division data 214 associated with the MAC address of the printer 100 is in the database 90 of the transmitting server 50, the contents of a responding process of FIG. 2 will be described.

In Step S10, the receiving unit 80 of the transmitting server 50 monitors reception of a request command from the printer 100. A request command includes the MAC address of the printer 100, information representing a data size transmittable in response to the request command (hereinafter, referred to as a request data size), and information representing a start position of data to be transmitted in response to the request command (hereinafter, referred to as a request start position).

The request data size is information designated by the printer 100, and depends on the current available capacity of a memory (not shown) of the printer 100. That is, the printer 100 determines a larger request data size as the current available capacity of the memory of the printer 100 is larger. Also, the request start position is information designated by the printer 100, and depends on the data size of a part of the binary data 212 already received by the printer 100. That is, the printer 100 determines the next data position of the received part of the binary data 212 as the request start position. For example, in a situation in which any portion of the binary data 212 has not been received, the printer 100 determines the first byte portion as the request start position. Also, for example, in a situation in which the first to 4M-th byte portions of the binary data 212 has been already received, the printer 100 determines the (4M+1)-th byte portion as the request start position.

If a request command is received from the printer 100, the receiving unit 80 determines "YES" in Step S10, and process proceeds to Step S12. In Step S12, the determining unit 84 specifies an ID corresponding to a division data including the request start position included in the received request command (hereinafter, referred to as an IDstart). As described above, in the present illustrative embodiment, the binary data 212 is divided into the division data in the division unit of 4 M bytes, and the IDs corresponding to the division data are set such that numeral values increases in ascending order. Based on these rules and the request start position, the determining unit 84 can specify an IDstart. More specifically, the determining unit 84 divides the value of the request start position by the division unit value X (that is, 4 M bytes) and rounding up the result of the division, thereby calculating an integer value, and specifies an ID corresponding to the calculated integer value as the IDstart.

For example, in a case where the request start position is the first byte portion, the determining unit 84 divides 1 byte by 4 M bytes, and rounds up the value of the result of the division, thereby calculating an integer value "1". Subsequently, the determining unit 84 specifies "ID001" corresponding to the calculated integer value "1", as the IDstart. Also, for example, in a case where the request start position is the (4M+1)-th byte portion, the determining unit 84 divides the (4M+1)-th bytes by 4M bytes, and rounds up the value of the result of the division, thereby calculating an integer value "2". Subsequently, the determining unit 84 specifies "ID002" corresponding to the calculated integer value "2", as the IDstart.

Next, in Step S14, the determining unit 84 compares a request data size Y included in the received request command, with the division unit value X. In a case where the request data size Y is smaller than the division unit value X, the determining unit 84 determines "YES" in Step S14, and the process proceeds to Step S18. Meanwhile, in a case where the request data size Y is not smaller than the division unit value X, the determining unit 84 determines "NO" in Step S14, and proceeds to Step S20.

In Step S18, the determining unit 84 determines "1" as the number L of division data which should be acquired from the database 90. Meanwhile, in Step S20, the determining unit 84 determines, as the number L, the largest integer satisfying a relation in which the product value of the number L and the division unit value X becomes smaller than the request data size Y (that is, L×X≤Y). For example, in a case where the division unit value X is 4 M bytes, and the request data size Y is 9M bytes, the number L is "2". Also, for example, in a case where the division unit value X is 4 M bytes, and the request data size Y is 5 M bytes, the number L is "1". As described above, according to the present illustrative embodiment, in Steps S14 to S20, the determining unit 84 can use the division unit value X (that is, 4 M bytes) and the request data size Y included in the request command to appropriately determine the number L.

In Step S30, the writing unit 86 acquires one or more division data of the plurality of division data 214 associated with the MAC address of the printer 100 included in the received request command, and writes the one or more division data in the VRAM 76. Specifically, the writing unit 86 acquires L-number of division data corresponding to the IDstart, IDstart+1, IDstart+2, . . . , and IDstart+(L−1), from the database 90, and writes the L-number of division data in the VRAM 76. For example, in a case where the IDstart is "ID001", and the number L is "1" (for example, a case where Step S18 has been performed), the writing unit 86 writes one division data, corresponding to "ID001", of the plurality of division data 214, in the VRAM 76. Also, for example, in a case where the IDstart is "ID003", and the number L is "2" (for example, a case where Step S20 has been performed), the writing unit 86 writes two division data, corresponding to "ID003" and "ID004", of the plurality of division data 214, in the VRAM 76.

As described above, in Step S30, the writing unit 86 writes the L-number of division data corresponding to the IDstart and the subsequent IDs, in the VRAM 76. Therefore, the writing unit 86 can appropriately write the L-number of division data including a portion from the request start position designated by the printer 100, that is, the L-number of division data including a portion having not been transmitted yet, in the VRAM 76.

Also, for example, in a case where the four division data 214 corresponding to "ID001" to "ID004" are in the database 90, and the IDstart is "ID003", and the number L is "3", even though the number L is "3", the writing unit 86 writes only two division data corresponding to "ID003" and "ID004", in the VRAM 76. This is because a division data corresponding to "ID005" does not exist. As described above, in a case where the L-number of division data which should be acquired is not in the database 90, the writing unit 86 writes less than L division data in the VRAM 76.

Next, in Step S32, the transmitting unit 88 transmits a portion of the L-number of partial binary data, included in the L-number of division data (or less than L division data) written in the VRAM 76, from the request start position to a position set such that a transmission data size does not exceed the request data size Y, to the printer 100. Hereinafter, a position set such that a transmission data size does not exceed the request data size Y is referred to simply as a position which does not exceed the request data size Y.

For example, it is assumed a first situation in which the IDstart is "ID001", and the division unit value X is 4 M bytes, and the request data size Y is 3 M bytes. In the first situation, the determination result of Step S14 becomes "YES", and "1" is determined as the number L in Step S18, and one division data corresponding to "ID001" (that is, a division data from the first byte portion to the 4M-th byte portion) is written in the VRAM 76.

In the first situation, for example, in a case where the request start position is the first byte portion, in Step S32, the transmitting unit 88 transmits a portion of the first to 4M-th byte partial binary data written in the VRAM 76, from the first byte portion which is the request start position to a 3M-th byte portion which is the position which does not exceed the request data size Y, to the printer 100.

Also, in the first situation, for example, in a case where the request start position is the (3M+1)-th byte portion, in Step S32, the transmitting unit 88 transmits a portion (that is, data of 1 M byte) of the 4M-th byte partial binary data written in the VRAM 76, from the (3M+1)-th which is the request start position to a 4M-th byte portion which is the position which does not exceed the request data size Y (that is an end portion of the corresponding partial binary data), to the printer 100.

Also, for example, it is assumed a second situation in which the IDstart is "ID001", and the division unit value X is 4 M bytes, and the request data size Y is 9M bytes. In the second situation, the determination result of Step S14 becomes "NO", and "2" is determined as the number L in Step S20, and two division data corresponding to "ID001" and "ID002" (that is, partial binary data of the first to 8M-th byte portions) are written in the VRAM 76. In the second situation, in a case where the request start position is the first byte portion, in Step S32, the transmitting unit 88 transmits a portion (that is, data of 8 M bytes) of the first to 8M-th byte partial binary data written in the VRAM 76, from the first byte portion which is the request start position to a 8M-th byte portion which is the position which does not exceed the request data size Y (that is, an end position of the corresponding partial binary data), to the printer 100.

As described above, the determining unit 84, the writing unit 86, and the transmitting unit 88 perform the processes of Steps S12 to S32, whereby the function of the providing unit 82 is implemented. That is, in Steps S12 to S30, the providing unit 82 acquires one or more division data (that is, one or more partial binary data) which is a portion of the plurality of division data 214, from the database 90, and writes the one or more division data in the VRAM 76. Subsequently, in Step S32, the providing unit 82 provides at least a portion of one or more partial binary data included in the one or more division data written in the VRAM 76.

Next, in Step S34, the control unit 70 deletes the division data having been written in the VRAM 76 in Step S30, from the VRAM 76. As a result, an area where the division data were written is released. Therefore the control unit 70 can use the corresponding area to perform a variety of processes (for example, a process of responding to the request command received from a printer different from the printer 100).

If Step S34 finishes, the control unit 70 returns to Step S10. That is, each time when one request command is received from the printer 100, the control unit 70 performs the processes of Steps S12 to S34.

(FIG. 4 Followed by FIG. 2)

Subsequently, the contents of processes followed by FIG. 2 will be described with reference to FIG. 4. In FIG. 4, the portable terminal 110 and the conversion server 10 of FIG. 2 do not perform any processes, and thus the portable terminal 110 and the conversion server 10 are not shown.

After transmitting the conversion instruction and the PDF data 210 to the conversion server 10 (see FIG. 2), the printer 100 transmits a first request command to the transmitting server 50. Since the printer 100 has not yet received any data of the binary data 212, the printer 100 transmits the first request command in which the first byte portion is set as the request start position. Also, in the example of FIG. 4, the printer 100 determines 9 M bytes as the request data size based on the available capacity of the memory of the printer 100, and transmits the first request command in which a size of 9 M bytes is set as the request data size. Further, if the printer 100 determines the request data size (that is, 9 M bytes) on an occasion of transmitting the first request command, the printer 100 determines the same request data size (that is, 9 M bytes) on occasions of transmitting second and subsequent request commands.

If the first request command is received from the printer 100 ("YES" in Step S10 of FIG. 3), in Step S12, the transmitting server 50 specifies "ID001" as the IDstart based on that the request start position is the first byte portion. Since the division unit value X is 4 M bytes and the request data size Y is 9 M bytes, the transmitting server 50 determines that the division unit value X is not larger than the request data size Y ("NO" in Step S14), and determines the largest integer "2" satisfying a relation of L×X (4 M bytes)≤Y (9 M bytes), as the number L.

In Step S30, the transmitting server 50 acquires only two division data, corresponding to "ID001" and "ID002", of the four division data 214 corresponding to "ID001" to "ID004", from the database 90, and writes the corresponding two division data in VRAM 76. In Step S32, the transmitting server 50 transmits a portion (that is, data of 8 M bytes) of two partial binary data (that is, partial binary data of the first to 8M-th bytes), included in the two division data written in the VRAM 76, from the first byte portion which is the request start position to a 8M-th byte portion which is the position which does not exceed the request data size Y (that is, the end position of the corresponding partial binary data), to the printer 100. Next, in Step S34, the transmitting server 50 deletes the two division data from the VRAM 76.

If the first to 8M-th byte portion (that is, a portion of the binary data 212) is received from the transmitting server 50, the printer 100 performs printing according to the received portion.

Subsequently, the printer 100 transmits a second request command to the transmitting server 50. Since the printer 100 has already received the first to 8M-th bytes, the printer 100 transmits the second request command including the (8M+1)-th byte as the request start position. The second request command includes a size of 9M bytes as the request data size.

If the second request command is received from the printer 100 ("YES" in Step S10), in Step S12, the transmitting server 50 specifies "ID003" as the IDstart based on that the request start position is the (8M+1)-th byte. Similarly to the case of the first request command, if it is determined that the division unit value X is not larger than the request data size Y ("NO" in Step S14), in Step S20, the transmitting server 50 determines "2" as the number L.

In Step S30, the transmitting server 50 acquires only two division data corresponding to "ID003" and "ID004" of the four division data corresponding to "ID001" to "ID004", from the database 90, and writes the corresponding two division data in the VRAM 76. In Step S32, the transmitting server 50 transmits a portion (that is, data of 6 M bytes) of two partial binary data included in the two division data written in the VRAM 76, from the (8M+1)-th byte which is the request start position to the 14M-th byte that is a position which does not exceed the request data size Y (that is, the end position of the corresponding two partial binary data), to the printer 100. Next, in Step S34, the transmitting server 50 deletes the two division data from the VRAM 76.

If the (8M+1)-th to 14M-th byte portion (that is, a portion of the binary data) is received from the transmitting server 50, the printer 100 performs printing according to the received portion. In this way, the printer 100 can receive all of the binary data 212 (that is, the four partial binary data) from the transmitting server 50, and perform printing according to the binary data 212.

As described above, according to the present illustrative embodiment, in a case where the target data (that is, the PDF data 210) to be printed is not interpretable, the printer 100 can use the conversion server 10 and the transmitting server 50 to appropriately perform printing. According to the present illustrative embodiment, even if a program for interpreting data of a variety of formats is not installed in the printer 100, the printer 100 can perform printing of images represented by target data of a variety of formats.

Also, even though it is not shown in the flow chart and the sequence diagram, after each division data 214 is stored in association with the MAC address of the printer 100 in the database, if a predetermined time elapses, the control unit 70 of the transmitting server 50 deletes the corresponding division data 214 from the database 90. According to this configuration, until the above described predetermined time elapses, the printer 100 can acquire the binary data 212 from the transmitting server 50 over a plurality of times, and can perform printing over a plurality of times.

Incidentally, in a modified example, if all of the division data 214 are received by the printer 100, the control unit 70 may delete the division data 214 from the database 90 without waiting for the above described predetermined time to elapse. According to this configuration, it is possible to quickly delete the binary data 212 from the database 90 and suppress occurrence of an event in which the available capacity of the database 90 is insufficient.

(Contents of Cases which are Implemented in Illustrative Embodiment: FIGS. 5 and 6)

Case A1 of FIG. 5 is the case of FIG. 4 and represented in a table. A column "NUMBER OF TIMES" represents the number of times of request command transmission from the printer 100 to the transmitting server 50. A column "PARAMETERS" represents the IDstart specified in Step S12 of FIG. 3, and the number L determined in Step S18 or S20. A column "ACQUIRED DATA" schematically represents partial binary data acquired from the database 90 in Step S30 (that is, partial binary data written in the VRAM 76). A column "RESPONSE DATA" schematically represents data transmitted to the printer 100 in Step S32.

Also, the columns of a table corresponding to each of cases (such as Case A3 of FIG. 6 and Case B1 of FIG. 9) other than Case A1 are similar to the columns of the table of Case A1. Further, in each case, it is assumed a situation where the four division data 214 generated from the binary data 212 of 14 M bytes are in the database 90.

(Case A1)

As described above with reference to FIG. 4, in Case A1 of FIG. 5, the division unit value X is 4 M bytes, and the request data size Y is 9 M bytes. In Case A1, in response to the first request command, the transmitting server 50 writes the two division data corresponding to "ID001" and "ID002" in the VRAM 76 in Step S30 of FIG. 3. Next, in Step S32, the transmitting server 50 transmits all of the two partial binary data (that is, partial binary data of the first to 8M-th bytes) included in the two division data written in VRAM 76, to the printer 100.

In response to the second request command, the transmitting server 50 writes the two division data corresponding to "ID003" and "ID004", in the VRAM 76 in Step S30. Then, in Step S32, the transmitting server 50 transmits all of the two partial binary data (that is, partial binary data of the (8M+1)-th to 14M-th bytes) included in the two division data written in VRAM 76, to the printer 100.

(Case A2)

In Case A2 of FIG. 5, the division unit value X is 4 M bytes, and the request data size Y is 13 M bytes. In Case A2, if a first request command is received, the transmitting server 50 specifies "ID001" as the IDstart in Step S12, and determines that the division unit value X is not larger than the request data size Y ("NO" in Step S14), and determines the largest integer "3" satisfying a relation of L×X (4 M bytes)≤Y (13 M bytes), as the number L in Step S20. Therefore, in Step S30, the transmitting server 50 writes three division data corresponding to "ID001", "ID002", and "ID003", in the VRAM 76. Next, in Step S32, the transmitting server 50 transmits all of three partial binary data (that is, partial binary data of the first to 12M-th bytes) included in the three division data written in the VRAM 76, to the printer 100.

Since the portion of the first to 12M-th bytes has been transmitted to the printer 100 in response to the first request command, a second request command includes information representing that the request start position is the (12M+1)-th byte. If receiving the second request command, the transmitting server 50 specifies "ID004" as the IDstart in Step S12, and determines that the division unit value X is not larger than the request data size Y ("NO" in Step S14), and determines "3" as the number L in Step S20. However, since division data corresponding to "ID005" and the subsequent IDs are not in the database 90, although the number L is "3", in Step S30, the transmitting server 50 writes only one division data corresponding to "ID004", in the VRAM 76. Next, in Step S32, the transmitting server 50 transmits all of one partial binary data (that is, a partial binary data of the (12M+1)-th to 14M-th bytes) included in the one division data written in VRAM 76, to the printer 100.

(Case A3)

In Case A3 of FIG. 6, the division unit value X is 4 M bytes, and the request data size Y is 5 M bytes. In Case A3, if a first request command is received, the transmitting server 50 specifies "ID001" as the IDstart in Step S12, and determines that the division unit value X is not larger than the request data size Y ("NO" in Step S14), and determines the largest integer "1" satisfying a relation of L×X (4 M bytes)≤Y (5 M bytes), as the number L in Step S20. Therefore, in Step S30, the transmitting server 50 writes one division data corresponding to "ID001", in the VRAM 76. Next, in Step S32, the transmitting server 50 transmits all of one partial binary data (that is, a partial binary data of the first to 4M-th bytes) included in the one division data written in the VRAM 76, to the printer 100.

Since the portion of the first to 4M-th bytes has been transmitted to the printer 100 in response to the first request command, a second request command includes information representing that the request start position is the (4M+1)-th byte. If receiving the second request command, the transmitting server 50 specifies "ID002" as the IDstart in Step S12, and determines that the division unit value X is not larger than the request data size Y ("NO" in Step S14), and determines "1" as the number L in Step S20. Therefore, in Step S30, the transmitting server 50 writes one division data corresponding to "ID002", in the VRAM 76. Next, in Step S32, the transmitting server 50 transmits all of one partial binary data (that is, a partial binary data of the (4M+1)-th to 8M-th bytes) included in the one division data written in the VRAM 76, to the printer 100.

Operations where the third and subsequent request commands are received are similar to the operations where the first and second request commands are received. In Case A3, the transmitting server 50 can transmit all of the binary data 212 to the printer 100 in response to four request commands.

(Case A4)

In Case A4 of FIG. 6, the division unit value X is 4 M bytes, and the request data size Y is 3 M bytes. In Case A4, if a first request command is received, the transmitting server 50 specifies "ID001" as the IDstart in Step S12, and determines that the division unit value X is larger than the request data size Y ("YES" in Step S14), and determines "1" as the number L in Step S18. Therefore, in Step S30, the transmitting server 50 writes one division data corresponding to "ID001", in the VRAM 76. Next, in Step S32, the transmitting server 50 transmits a portion (that is, only a portion of the first to 3M-th bytes) of one partial binary data (that is, a partial binary data of the first to 4M-th partial bytes), included in the one division data written in the VRAM 76, from the first byte which is the request start position to a 3M-th byte which is the position which does not exceed the request data size Y, to the printer 100.

Since the portion of the first to 3M-th bytes has been transmitted to the printer 100 in response to the first request command, a second request command includes information representing that the request start position is the (3M+1)-th byte. If receiving the second request command, the transmitting server 50 specifies "ID001" as the IDstart in Step S12, and determines that the division unit value X is not larger than the request data size Y ("NO" in Step S14), and determines "1" as the number L in Step S18. Therefore, in Step S30, the transmitting server 50 rewrites one division data corresponding to "ID001", in the VRAM 76. Next, in Step S32, the transmitting server 50 transmits a portion (that is, only a portion of the (3M+1)-th to 4M-th bytes) of one partial binary data (that is, a partial binary data of the first to 4M-th partial bytes), included in the one division data written in the VRAM 76, from the (3M+1)-th byte which is the request start position to a 4M-th byte (that is, the end position of the corresponding partial binary data) which is the position which does not exceed the request data size Y, to the printer 100.

Operations where the third and subsequent request commands are received are similar to the operations where the first and second request commands are received. In Case A4, the transmitting server 50 can transmit all of the binary data 212 to the printer 100 in response to seventh request commands.

(Effects of Illustrative Embodiment)

For example, it is assumed that the configuration of a comparative example of FIG. 7 is employed. In the configuration of the comparative example, the binary data 212 of 14 M bytes is stored in an undivided state in the database 90. That is, the binary data 202 in the database 90 is not a plurality of division data distinguishable by a plurality of start data and a plurality of IDs. In this case, the transmitting server 50 cannot acquire only a portion of the binary data 212 from the database 90, and cannot write only the portion in the VRAM 76. That is, the transmitting server 50 can only acquire all of the binary data 212 from the database 90 and write all of the binary data 212 in the VRAM 76.

For example, it is assumed a case where the request data size Y of the printer 100 is 5 M bytes like in Case A3 of FIG. 6. If a first request command including information representing that the request start position is the first byte and the request data size is 5 M bytes is received, the transmitting server 50 writes all of the binary data 212 of 14 M bytes in the VRAM 76. Next, the transmitting server 50 transmits a portion of the first to 5M-th bytes, which is in a request data size range of 5 M bytes, of the binary data 212 of the 14 M bytes written in the VRAM 76, to the printer 100. Subsequently, the transmitting server 50 deletes the binary data 212 from the VRAM 76.

Similarly, if receiving a second request command, the transmitting server 50 rewrites all of the binary data 212 of 14 M byte in the VRAM 76, and transmits a portion of (5M+1)-th to 10M-th bytes to the printer 100. If receiving a third request command, the transmitting server 50 rewrites all of the binary data 212 of 14 M bytes in the VRAM 76, and transmits a portion of (10M+1)-th to 14M-th bytes to the printer 100.

As described above, according to the comparative example, each time when one request command is received, the transmitting server 50 needs to write all of the binary data 212 of 14 M bytes in the VRAM 76. Therefore, consumption of the resource of the VRAM 76 is large. For example, if the data size of the binary data 212 is enormous, enormous capacity of the VRAM 76 is consumed. In this situation, in a case where a request command is received from a printer different from the printer 100, the transmitting server 50 may be incapable of writing binary data for the received request command and transmitting the binary data to the printer.

In contrast to this, in the present illustrative embodiment, the binary data 212 of 14 M bytes are divided into four division data which are stored in the database 90. For example, as shown in Case A3 of FIG. 6, in a case where a request command including information representing that the request data size is 5 M bytes like in the comparative example, the transmitting server 50 does not need to write all of the binary data 212 of 14 M bytes in the VRAM 76, and needs only to write one division data in the VRAM 76. Therefore, it is possible to suppress consumption of the resource of the VRAM 76 from being large. According to the present illustrative embodiment, the transmitting server 50 can appropriately provide the binary data 212 to the printer 100 while reducing a data amount to be written in the VRAM 76 as compared to the comparative example. As a result, it is possible to appropriately suppress occurrence of the above described situation which can occur in the comparative example.

Incidentally, for example, in the comparative example of FIG. 7, the transmitting server 50 can provide all of the binary data 212 to the printer 100 in response to three request commands. In contrast to this, for example, in Case A3 of FIG. 6 of the present illustrative embodiment, the transmitting server 50 can provide all of the binary data 212 to the printer 100 in response to four request commands. Therefore, in the present illustrative embodiment, the number of request commands to be transmitted from the printer 100 to the transmitting server 50 may increase. For this reason, in the present illustrative embodiment, a printing time from when the printer 100 transmits the first request command to when printing according to all of the binary data 212 finishes may seem to be longer as compared to the comparative example.

However, between the present illustrative embodiment and the comparative example, the total data amount which is transmitted between the printer 100 and the transmitting server 50 is the same. Therefore, between the present illustrative embodiment and the comparative example, a data communication time is the same. However, in the comparative example, each time when one request command is received, the transmitting server 50 needs to write all of the binary data 212 in the VRAM 76, and thus a writing time becomes relatively longer. In contrast to this, in the present illustrative embodiment, each time when one request command is received, the transmitting server 50 needs only to write a portion of the binary data 212 in the VRAM 76, and thus a writing time is relatively short. Therefore, according to the present illustrative embodiment, the transmitting server 50 can more quickly provide all of the binary data 212 to the printer 100 as compared to the comparative example. As a result, it is possible to reduce the printing time.

Also, in the present illustrative embodiment, in a case where the division unit value X is not larger than the request data size Y as shown in Case A1 and Case A2 of FIG. 5 and Case A3 of FIG. 3, the L-number of partial binary data having a data size smaller than the request data size Y is written in the VRAM 76, and all of the L-number of partial binary data written in the VRAM 76 are transmitted to the printer 100. That is, the data size of the partial binary data written in the VRAM 76 is equal to the data size of the partial binary data transmitted to the printer 100. Therefore, in the case where the division unit value X is not larger than the request data size Y, since a portion which will not be transmitted to the printer 100 is not written in the VRAM 76, it can be said that the VRAM 76 is efficiently used. According to the present illustrative embodiment, the transmitting server 50 can provide the binary data 212 to the printer 100 while efficiently using the VRAM 76.

Also, in a case where the division unit value X is larger than the request data size Y as in Case A4 of FIG. 6, one partial binary data having a data size (that is, 4 M bytes) larger than the request data size Y (that is, 3 M bytes) is written in the VRAM 76. That is, the data size (that is, 4 M bytes) of the partial binary data written in the VRAM 76 is larger than the data size (that is, 3 M bytes) of a partial binary data to be transmitted to the printer 100. Therefore, in the case where the division unit value X is larger than the request data size Y, a portion which will not be transmitted to the printer 100 is written in the VRAM 76.

However, in the present illustrative embodiment, for example, even in a case where the second request command is received, only one partial binary data corresponding to "ID001" is written in the VRAM 76, and a portion of the (3M+1)-th to 4M-th bytes is transmitted to the printer 100. That is, in this case, the data size of a portion (a portion of the first to 3M-th bytes), which will not be transmitted to the printer 100, of the partial binary data written in the VRAM 76 is 3 M bytes. In contrast to this, for example, it can be considered to use a configuration in which, in the case where the second request command is received, two partial binary data corresponding to "ID001" and "ID002" are written in the VRAM 76, and a portion of the (3M+1)-th to 6M-th bytes is transmitted to the printer 100 (see Case B3 of FIG. 10 of a second illustrative embodiment to be described below). However, according to this configuration, the data size of portions (a portion of the first to 3M-th bytes and a portion of the (6M+1)-th to 8M-th bytes), which will not be transmitted to the printer 100, of the partial binary data written in the VRAM 76 in response to the second request command is 5 M bytes. That is, according to this configuration, the data size of a portion, which will not be transmitted to the printer 100, of the partial binary data written in the VRAM 76 may be larger as compared to the present illustrative embodiment.

In the present illustrative embodiment, since a configuration in which only one partial binary data is written in the VRAM 76 in the case where the division unit value X is larger than the request data size Y, it is possible to reduce the data size of a portion, which will not be transmitted to the printer 100, of the partial binary data written in the VRAM 76. Even in this viewpoint, the transmitting server 50 of the present illustrative embodiment can provide the binary data 212 to the printer 100 while efficiently using the VRAM 76.

(Correspondence)

The transmitting server 50, the conversion server 10, and the printer 100 are examples of a first server, a second server, and an external apparatus, respectively. The database 90 and the VRAM 76 are examples of an external storage device and an internal storage device, respectively. The PDF data 210 and the binary data 212 are examples of the target data and the converted data, respectively. The four partial binary data (PBD) included in the four division data (DD) 214 are examples of P-number of partial data. The division unit value X (that is, 4 M bytes) and the request data size Y are examples of a predetermined data size and size information, respectively.

For example, in Case A1 of FIG. 5, 9 M bytes which is the request data size Y is an example of a first data size, and "2" which is the number L is an example of N1. The first request command and the second request command are examples of a first request command and a second request command, respectively. The two partial binary data included in the two division data corresponding to "ID001" and "ID002" are examples of N1-number of untransmitted partial data of a first group. Also, the two partial binary data included in the two division data corresponding to "ID003" and "ID004" are examples of N1-number of untransmitted partial data of a second group.

For example, in Case A4 of FIG. 6, 3 M bytes which is the request data size Y is an example of a third data size. The first request command and the second request command are examples of a fifth request command and a sixth request command, respectively. The one partial binary data included in the one division data corresponding to "ID001" is an example of a first untransmitted partial data. The portion of the first to 3M-th bytes transmitted in response to the first request command, and the portion of the (3M+1)-th to 4M-th bytes transmitted in response to the second request command are examples of a third portion and a fourth portion, respectively.

Second Illustrative Embodiment

As described above, in the first illustrative embodiment, in order to efficiently use the VRAM 76, the following processes (1) and (2) are performed. (1) In the case where the division unit value X is not larger than the request data size Y (that is, in a case of "NO" in Step S14 of FIG. 3), L-number of partial binary data having a data size equal to or smaller than the request data size Y are written in the VRAM 76 (that is, in Step S30 followed by Step S20). (2) In the case where the division unit value X is larger than the request data size Y (that is, in a case of "YES" in Step S14), always, only one partial binary data is written in the VRAM 76 (that is, in Step S30 followed by Step S18).

In contrast to this, in the second illustrative embodiment, in order to transmit a portion having a data size equal to the request data size Y designated by the printer 100, to the printer 100, the following processes (3) and (4) are performed. (3) In the case where the division unit value X is not larger than the request data size Y (that is, in a case of "NO" in Step S54 of FIG. 8 to be described below), L-number of partial binary data having a data size larger than the request data size Y may be written in the VRAM 76 (that is, in Step S70 followed by Step S64). (2) In the case where the division unit value X is larger than the request data size Y (that is, in a case of "YES" in Step S54), two partial binary data can be written in the VRAM 76 (that is, in Step S70 followed by Step S62).

Figure 8:
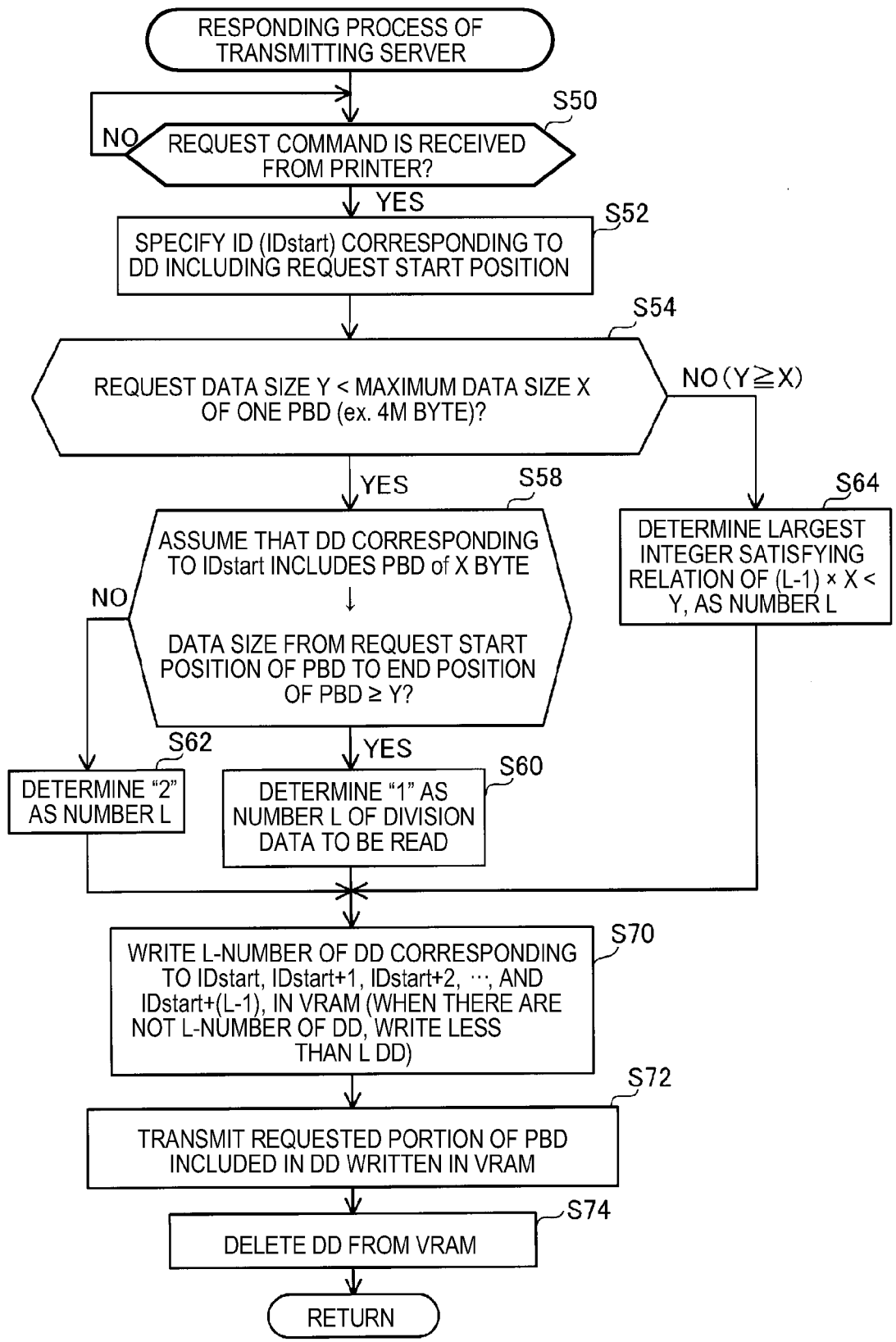
FIG. 8 is a flow chart illustrating a responding process of a transmitting server of a second illustrative embodiment.

(Responding Process of Transmitting Server 50: FIG. 8)

In the present illustrative embodiment, the control unit 70 of the transmitting server 50 performs a responding process of FIG. 8, instead of the responding process of FIG. 3. Steps S50 to S54 are similar to Steps S10 to S14 of FIG. 3. In a case of "YES" in Step S54 (that is, the case where the division unit value X is larger than the request data size Y), the control unit 70 proceeds to Step S58; whereas in a case of "NO" in Step S54 (that is, the case where the division unit value X is not larger than the request data size Y), the control unit 70 proceeds to Step S64.

In Step S58, the determining unit 84 first assumes that one division data corresponding to the IDstart includes a partial binary data (hereinafter, referred to as a specific partial binary data) of 4 M bytes (that is, the division unit value X). For example, in a case where the IDstart is "ID001", the determining unit 84 assumes the start position of the specific partial binary data is the first byte, and the end position of the specific partial binary data is the 4M-th byte. These assumptions are made due to the following reason. As described above, in the P-number of division data 214 stored in the database 90, each of (P−1)-number of partial binary data included in the first to (P−1)-th division data has a data size (that is, 4 M bytes) equal to the division unit value X. However, the partial binary data included in the P-th division data (that is, one division data corresponding to the largest ID) can have a data size smaller than the division unit value X. Further, the determining unit 84 cannot know the data size of the partial binary data included in the P-th division data in a state where the P-th division data does not exist in the VRAM 76. Therefore, in a case where one division data corresponding to the IDstart is the P-th division data, the actual data size of the specific partial binary data included in the P-th division data can be smaller than 4M bytes. However, on the assumption that the data size of the specific partial binary data is 4 M bytes, the determining unit 84 performs the subsequent processes.

Next, the determining unit 84 determines whether the data size from the request start position of the specific partial binary data to the end position of the specific partial binary data (for example, the 4M-th byte in the above described example).

For example, it is assumed that the request start position is the first byte and the request data size Y is 3 M bytes. In this case, since the data size (4 M bytes) from the request start position (the first byte) of the specific partial binary data (that is, the first to 4M-th bytes) to the end position (the 4M-th byte) of the specific partial binary data is larger than the request data size Y (that is, 3 M bytes), the determining unit 84 determines "YES" in Step S58, and proceeds to Step S60.

The result "YES" of the determination of Step S58 means that the data size of an untransmitted portion which has been not transmitted yet to the printer 100, of the specific partial binary data included in one division data corresponding to the IDstart is equal to or larger than the request data size Y. Therefore, if the one division data corresponding to the IDstart is written in the VRAM 76, the untransmitted portion having a data size equal to the request data size Y can be transmitted to the printer 100. Therefore, in a case of "YES" in Step S58, in Step S60, the determining unit 84 determines "1" as the number L of division data which should be acquired from the database 90.

Also, for example, it is assumed that the request start position is the (3M+1)-th byte, and the request data size Y is 3 M bytes. In this case, since the data size (1 M bytes) from the request start position (the (3M+1)-th byte) of the specific partial binary data (that is, the first to 4M-th bytes) to the end position (the 4M-th byte) of the specific partial binary data is smaller than the request data size Y (that is, 3M bytes), the determining unit 84 determines "NO" in Step S58, and proceeds to Step S62.

The result "NO" of the determination of Step S58 means that the data size of an untransmitted portion, which has been not untransmitted yet to the printer 100, of the specific partial binary data included in one division data corresponding to the IDstart is smaller than the request data size Y. Therefore, even if the one division data corresponding to the IDstart is written in the VRAM 76, the untransmitted portion having a data size equal to the request data size Y cannot be transmitted to the printer 100. In order to transmit the untransmitted portion having a data size equal to the request data size Y to the printer 100, not only the one division data corresponding to the IDstart but also one division data corresponding to the next ID of the IDstart need to be written in the VRAM 76. Therefore, in a case of "NO" in Step S58, in Step S62, the determining unit 84 determines "2" as the number L of division data which should be acquired from the database 90.

Meanwhile, in Step S64, the determining unit 84 determines the largest integer satisfying a relation in which the product value of the number (L−1) and the division unit value X becomes smaller than the request data size Y (that is, (L−1)×X<Y). For example, in a case where the division unit value X is 4 M bytes, and the request data size Y is 9 M bytes, the number L is "3". As a result, in Step S70 (to be described below), three division data can be written, and thus three partial binary data having a data size (that is, 12 M bytes) larger than the request data size Y can be written in the VRAM 76. Therefore, it is possible to transmit an untransmitted portion having a data size equal to the request data size Y, to the printer 100.

After any one of Steps S60 to S64 is performed, the control unit 70 proceeds to Step S70. Steps S70 to S74 are similar to Steps S30 to S34 of FIG. 3. If Step S74 finishes, the control unit 70 returns to Step S50.

(Contents of Cases Which are Implemented in Illustrative Embodiment: FIGS. 9 and 10)

In Case B1 of FIG. 9, the division unit value X is 4 M bytes, and the request data size Y is 9 M bytes. In Case B2, if a first request command is received, the transmitting server 50 specifies "ID001" as the IDstart in Step S52 of FIG. 8, and determines that the division unit value X is not larger than the request data size Y ("NO" in Step S54), and determines the largest integer "3" satisfying a relation of ((L−1)×X (4 M bytes))<Y (9 M bytes), as the number L in Step S64. Therefore, in Step S70, the transmitting server 50 writes three division data corresponding to "ID001", "ID002", and "ID003", in the VRAM 76. Next, in Step S72, the transmitting server 50 transmits a portion (that is, only a portion of the first to 9M-th bytes) of three partial binary data (that is, partial binary data of the first to 12M-th bytes) included in the three division data written in the VRAM 76, from the first byte which is the request start position to the 9M-th byte which is the position which does not exceed the request data size Y, to the printer 100.

Since the portion of the first to 9M-th bytes has been transmitted to the printer 100 in response to the first request command, a second request command includes information representing that the request start position is the (9M+1)-th byte. If receiving the second request command, the transmitting server 50 specifies "ID003" as the IDstart in Step S52, and determines that the division unit value X is not larger than the request data size Y ("NO" in Step S54), and determines "3" as the number L in Step S64. However, since division data corresponding to "ID005" and the subsequent IDs are not in the database 90, although the number L is "3", in Step S70, the transmitting server 50 writes only two division data corresponding to "ID003" and "ID004", in the VRAM 76. Next, in Step S72, the transmitting server 50 transmits a portion (that is, only a portion of (9M+1)-th to 14M-th bytes) of the two partial binary data (that is, partial binary data of the (12M+1)-th to 14M-th bytes) included in the two division data written in VRAM 76, from the (9M+1)-th byte which is the request start position to the 4M-th byte (that is, the end position of the corresponding partial binary data) which is the position which does not exceed the request data size Y, to the printer 100.

(Case B2)

In Case B2 of FIG. 10, the division unit value X is 4 M bytes, and the request data size Y is 5 M bytes. In Case B2, if a first request command is received, the transmitting server 50 specifies "ID001" as the IDstart in Step S52, and determines that the division unit value X is not larger than the request data size Y ("NO" in Step S54), and determines the largest integer "2" satisfying a relation of ((L−1)×X (4 M bytes))<Y (5 M bytes), as the number L in Step S64. Therefore, in Step S70, the transmitting server 50 writes two division data corresponding to "ID001" and "ID002", in the VRAM 76. Next, in Step S72, the transmitting server 50 transmits a portion (that is, only a portion of the first to 5M-th bytes) of two partial binary data (that is, partial binary data of the first to 8M-th bytes) included in the two division data written in the VRAM 76, from the first byte which is the request start position to the 5M-th byte which is the position which does not exceed the request data size Y, to the printer 100.

Operations where the second and subsequent request commands are received are similar to the operation where the first and request command is received. In Case B2, the transmitting server 50 can transmit all of the binary data 212 to the printer 100 in response to three request commands.

(Case B3)

In Case B3 of FIG. 10, the division unit value X is 4 M bytes, and the request data size Y is 3 M bytes. In Case B3, if a first request command is received, the transmitting server 50 specifies "ID001" as the IDstart in Step S52, and determines that the division unit value X is larger than the request data size Y ("YES" in Step S54). Next, the transmitting server 50 determines that the data size (that is, 4 M bytes) from the first byte which is the request start position to the end position (the 4M-th byte) of the specific partial binary data (that is, a partial binary data included in the division data corresponding to "ID001" is larger than the request data size Y (that is, 3 M bytes ("YES" in Step S58), and determines "1" as the number L in Step S60. Therefore, in Step S70, the transmitting server 50 writes one division data corresponding to "ID001", in the VRAM 76. Next, in Step S72, the transmitting server 50 transmits a portion (that is, only a portion of the first to 4M-th bytes) of one partial binary data (that is, a partial binary data of the first to 4M-th bytes) included in the one division data written in the VRAM 76, from the first byte which is the request start position to the 3M-th byte which is the position which does not exceed the request data size Y, to the printer 100.

Since the portion of the first to 3M-th bytes has been transmitted to the printer 100 in response to the first request command, a second request command includes information representing that the request start position is the (3M+1)-th byte. If a second request command is received, the transmitting server 50 specifies "ID001" as the IDstart in Step S52, and determines that the division unit value X is larger than the request data size Y ("YES" in Step S54). Next, the transmitting server 50 determines that the data size (that is, 1 M bytes) from the (3M+1)-th byte which is the request start position to the end position (the 4M-th byte) of the specific partial binary data is smaller than the request data size Y (that is, 3 M bytes ("NO" in Step S58), and determines "2" as the number L in Step S60. Therefore, in Step S70, the transmitting server 50 writes two division data corresponding to "ID001" and "ID002", in the VRAM 76. Next, in Step S72, the transmitting server 50 transmits a portion (that is, only a portion of the (3M+1)-th to 6M-th bytes) of two partial binary data (that is, partial binary data of the first to 8M-th bytes) included in the two division data written in the VRAM 76, from the first byte which is the request start position to the 6M-th byte which is the position which does not exceed the request data size Y, to the printer 100.

Operations where the third and subsequent request commands are received are similar to the operations where the first and second request commands are received. In Case B3, the transmitting server 50 can transmit all of the binary data 212 to the printer 100 in response to five request commands.

(Effects of Illustrative Embodiment)

Even in the present illustrative embodiment, the transmitting server 50 can appropriately provide the binary data 212 to the printer 100 while reducing a data amount to be written in the VRAM 76 as compared to the comparative example of FIG. 7.

Also, for example, the printer 100 may not determine the request data size Y based on the available capacity of the memory of the printer 100, and may determine the request data size Y in view of a data size (for example, a data size corresponding one so-called band) appropriate for performing printing. In view of this circumstances, in the present illustrative embodiment, for example, like in a situation where one request command of Case B1 of FIG. 9 is received, in the case where the division unit value X is not larger than the request data size Y, the transmitting server 50 can provide a portion having a data size equal to the request data size Y (that is, 9 M bytes) to the printer 100. This point is similar even in a case where the first and second request commands of Case B2 of FIG. 10 are received. Therefore, the transmitting server 50 can provide a portion having a data size appropriate for the printer 100 to perform printing, to the printer 100.

Also, like in a situation where first to fourth request commands of Case B3 of FIG. 10 are received, in the case where the division unit value X is not larger than the request data size Y, the transmitting server 50 can provide a portion having a data size equal to the request data size Y (that is, 3 M bytes) to the printer 100. Therefore, the transmitting server 50 can provide a portion having a data size appropriate for the printer 100 to perform printing, to the printer 100.

(Correspondence)

For example, in Case B2 of FIG. 10, 5 M bytes which is the request data size Y is an example of a second data size, and "2" which is the number L is an example of N2. The first request command and the second request command are examples of a third request command and a fourth request command, respectively. The two partial binary data included in the two division data corresponding to "ID001" and "ID002" are examples of N2-number of untransmitted partial data of a third group, and a portion of the first to 5M-th bytes of the corresponding two partial binary data is an example of a first portion. The two partial binary data included in the two division data corresponding to "ID002" and "ID003" are examples of N2-number of untransmitted partial data of a fourth group, and a portion of the (5M+1)-th to 10M-th bytes of the corresponding two partial binary data is an example of a second portion.

For example, in Case B3 of FIG. 10, 3 M bytes which is the request data size Y is an example of a third data size. The first request command and the second request command are examples of a fifth request command and a sixth request command, respectively. The one partial binary data included in the one division data corresponding to "ID001" and the one partial binary data included in the one division data corresponding to "ID002" are examples of a first untransmitted partial data and a second untransmitted partial data, respectively. The portion of the first byte to 3M-th bytes transmitted in response to the first request command, and the portion of the (3M+1)-th to 6M-th bytes are examples of a third portion and a fifth portion, respectively.

While the present invention has been shown and described with reference to certain illustrative embodiments thereof, it will be understood by those skilled in the art that various changes in form and details may be made therein without departing from the spirit and scope of the invention as defined by the appended claims. For example, the following modified examples are included.

(1) The external storage device may not be one called the database 90, and may be a hard disk, a USB memory inserted into the transmitting server 50, or a medium such as a CD, a DVD, or a floppy disk. Also, the external storage device may not be installed inside the transmitting server 50, and may be installed in any other apparatus configured separately from the transmitting server 50.

(2) The internal storage device may not be the VRAM 76, and may be a non-volatile RAM (NVRAM), a dynamic RAM (DRAM), or a static RAM (SRAM).

(3) In the above described illustrative embodiments, the conversion server 10 and the transmitting server 50 are configured separately from each other. However, the conversion server 10 and the transmitting server 50 may be configured integrally. In this modified example, the conversion server 10 and the transmitting server 50 configured integrally is an example of a server system.

(4) The target data may not be PDF data, and may be, for example, JPEG data, TIFF data, data generated by a word processing application, or data generated by a spreadsheet application. That is, the target data may be conversion target data of any format.

(5) The converted data may not be binary data, and may be, for example, ternary or higher-order data (for example, quaternary data representing a dot off state, a small dot state, a medium dot state, and a large dot state). Also, the converted data may be JPEG data interpretable by the printer 100. That is, the converted data may be data generated by conversion of target data and having any format.

(6) In the above described illustrative embodiments, if the printer 100 determines the request data size Y when the printer 100 needs to transmit the first request command to the transmitting server 50, the same request data size Y is used even when the printer 100 needs to transmit the second and subsequent request commands. In contrast to this, the printer 100 may determine the request data size Y based on the available capacity of the memory each time when the printer 100 needs to transmit one request command. For example, when the printer 100 needs to transmit the first request command, the printer 100 may determine a data size of 9 M bytes as the request data size Y, and when the printer 100 needs to transmit the second and subsequent request commands, the printer 100 may determine a data size (for example, a data size of 8 M bytes) different from the data size of 9 M bytes, as the request data size Y. Even in this modified example, in the responding process of FIG. 3 or 8, the determining unit 84 of the transmitting server 50 can appropriately determine the number L according to the request data size Y included in a request command. That is, each time when one request command is received, the determining unit may use size information included in the request command, and a predetermined data size, to determine the number of partial data which should be written in the internal storage device.

(7) For example, each of a plurality of request commands to be transmitted from the printer 100 to the transmitting server 50 may not include the request data size Y. That is, each of the plurality of request commands may not include size information. In this modified example, each time when one request command is received from the printer 100, the determining unit 84 of the transmitting server 50 may specify the IDstart, and always determine "1" as the number L. Further, the writing unit 86 may acquire only one of the plurality of division data 214 corresponding to the IDstart, from the database 90, and write the corresponding one division data in the VRAM 76. The transmitting unit 88 may transmit all of one partial binary data included in the one division data written in the VRAM 76, to the printer 100. Even in this modified example, the transmitting server 50 can provide the binary data 212 to the printer 100 while reducing a data amount to be written in the VRAM 76.

(8) For example, each of a plurality of request commands to be transmitted from the printer 100 to the transmitting server 50 may not include the request start position. In this modified example, the transmitting server 50 may manage the data size having been already transmitted to the printer 100. For example, in Case A1 of FIG. 5, in a case where the first request command is received, since the data size having been already transmitted to the printer 100 is zero, the transmitting unit 88 of the transmitting server 50 transmits a portion of the first to 8M-th bytes to the printer 100. At this time, the control unit 70 of the transmitting server 50 stores (that is, manages) 8 M bytes as the data size having been already transmitted to the printer 100. In a case where the second request command is received, since the data size having been already transmitted to the printer 100 is 8 M bytes, the transmitting unit 88 of the transmitting server 50 transmits a portion of the (8M+1)-th to 14M-th bytes to the printer 100. That is, the request start position may be managed by the printer 100 like in the above illustrative embodiments, or may be managed by the transmitting server 50 like in this modified example.

(9) The external apparatus is not limited to the printer 100, and may be an apparatus of any other kinds, such as a scanner, a multi-function apparatus, a facsimile, a PC, a server, or a portable terminal.

(10) In the above described illustrative embodiments, the CPUs 32 and 72 of the conversion server 10 and the transmitting server 50 perform processes according to software, whereby the function of each of the above described units 40, 42, and 80 to 88 is implemented. In contrast to this, a portion of the functions of the above described units 40, 42, and 80 to 88 may be implemented by hardware such as a logic circuit.

The technical elements described in the specification or the drawings can exhibit technical usefulness, either alone or in combination, and combinations are not limited to those described in the claims as filed. The techniques illustrated in the specification or the drawings can achieve a plurality of purposes at the same time, and achieving only one of them has technical usefulness.

What is claimed is:

1. A first server comprising:
   a processor; and
   memory which stores a computer program that, when executed by the processor, causes the first server to perform:
   receiving a plurality of request commands from an external apparatus sequentially, wherein each of the plurality of request commands is a command for requesting the first server to transmit converted data which is data generated by converting target data according to one conversion instruction and which is divided into P-number (P is an integer of two or more) of partial data and stored in an external storage device, and wherein each of at least (P−1)-number of partial data of the P-number of partial data has a predetermined data size; and
   providing the converted data stored in the external storage device to the external apparatus in response to each of the plurality of request commands, wherein the providing includes:
   writing one or more untransmitted partial data in an internal storage device of the first server by acquiring the one or more untransmitted partial data as a portion of the P-number of partial data from the external storage device each time when one request command of the plurality of request commands is received, wherein the untransmitted partial data is partial data including a portion, which has not been transmitted yet, of the P-number of partial data; and
   transmitting at least a portion of the one or more untransmitted partial data written in the internal storage device, to the external apparatus, each time when one request command of the plurality of request commands is received.

2. The first server according to claim 1,
   wherein each of the plurality of request commands includes size information representing a data size transmittable in response to the corresponding request command, and wherein the providing further includes:
   each time when one request command of the plurality of request commands is received, determining a number of partial data to be written in the internal storage device, based on the size information included in the request command, and the predetermined data size, and
wherein the writing writes the determined number of untransmitted partial data in the internal storage device by acquiring the determined number of untransmitted partial data from the external storage device.

3. The first server according to claim 2,
wherein when the receiving receives a first request command including first size information representing a first data size which is larger than the predetermined data size,
   the determining determines N1 as the number of partial data to be written in the internal storage device, wherein the N1 is an integer smaller than the number P, and is a largest integer satisfying a relation in which a product of the number N1 and the predetermined data size is not larger than the first data size,
   the writing writes N1-number of untransmitted partial data of a first group in the internal storage device by acquiring the N1-number of untransmitted partial data of the first group from the external storage device, and
   the transmitting transmits all of the N1-number of untransmitted partial data of the first group written in the internal storage device, to the external apparatus.

4. The first server according to claim 3,
wherein when the receiving receives a second request command including the first size information after receiving the first request command,
   the determining determines N1 as the number of partial data to be written in the internal storage device,
   the writing writes N1-number of untransmitted partial data of a second group in the internal storage device by acquiring the N1-number of untransmitted partial data of the second group from the external storage device, and
   the transmitting transmits all of the N1-number of untransmitted partial data of the second group written in the internal storage device, to the external apparatus.

5. The first server according to claim 2,
wherein when the receiving receives a third request command including second size information representing a second data size which is larger than the predetermined data size,
   the determining determines N2 as the number of partial data to be written in the internal storage device, wherein the N2 is an integer smaller than the number P, and is a largest integer satisfying a relation in which a product of (N2−1) and the predetermined data size is smaller than the second data size,
   the writing writes N2-number of untransmitted partial data of a third group in the internal storage device by acquiring the N2-number of untransmitted partial data of the third group from the external storage device, and
   the transmitting transmits only a first portion of the N2-number of untransmitted partial data of the third group written in the internal storage device, to the external apparatus, wherein the first portion is a portion which has the second data size and has not been transmitted yet to the external apparatus.

6. The first server according to claim 5,
wherein when the receiving receives a fourth request command including the second size information after receiving the third request command,
   the determining determines N2 as the number of partial data to be written in the internal storage device,
   the writing writes N2-number of untransmitted partial data of a fourth group in the internal storage device by acquiring the N2-number of untransmitted partial data of the fourth group from the external storage device, and
   the transmitting transmits only a second portion of the N2-number of untransmitted partial data of the fourth group written in the internal storage device, to the external apparatus, wherein the second portion is a portion which has the second data size and has not been transmitted yet to the external apparatus.

7. The first server according to claim 2,
wherein when the receiving receives a fifth request command including third size information representing a third data size which is smaller than the predetermined data size,
   the determining determines 1 as the number of partial data to be written in the internal storage device,
   the writing writes a first untransmitted partial data which is one untransmitted partial data in the internal storage device by acquiring the first untransmitted partial data from the external storage device, and
   the transmitting transmits only a third portion of the first untransmitted partial data written in the internal storage device, to the external apparatus, wherein the third portion is a portion which has the third data size and has not been transmitted yet to the external apparatus.

8. The first server according to claim 7,
wherein when the receiving receives a sixth request command including the third size information after receiving the fifth request command,
   the determining determines 1 as the number of partial data to be written in the internal storage device,
   the writing writes the first untransmitted partial data in the internal storage device by acquiring the first untransmitted partial data from the external storage device, and
   the transmitting transmits only a fourth portion of the first untransmitted partial data written in the internal storage device, to the external apparatus, wherein the fourth portion is a portion which has a data size equal to or smaller than the third data size and has not been transmitted yet to the external apparatus.

9. The first server according to claim 7,
wherein when the receiving receives a seventh request command including the third size information after receiving the fifth request command,
   the determining determines 2 as the number of partial data to be written in the internal storage device if a data size of a portion of the first untransmitted partial data, which has not been transmitted yet, is smaller than the third data size,
   the writing writes the first untransmitted partial data and a second untransmitted partial data different from the first untransmitted partial data in the internal storage device by acquiring the first and second untransmitted partial data from the external storage device, and
   the transmitting transmits only a fifth portion of the first and second untransmitted partial data written in the internal storage device, to the external apparatus, wherein the fifth portion is a portion which has the third data size and has not been transmitted yet to the external apparatus.

10. A server system comprising the first server according to claim 1, and a second server, wherein the second server comprises:
- a processor;
- memory which stores a computer program that, when executed by the processor, causes the second server to perform:
  - generating the converted data by performing conversion on the target data when the one conversion instruction and the target data are received from the external apparatus; and
  - storing the P-number of partial data in the external storage device after dividing the converted data into the P-number of partial data such that each of at least (P−1)-number of partial data of the P-number of partial data has the predetermined data size.

11. A non-transitory computer-readable medium storing a computer program for controlling a first server, the computer program, when executed by a processor of the first server, causing the first server to perform:
- receiving a plurality of request commands from an external apparatus sequentially, wherein each of the plurality of request commands is a command for requesting the first server to transmit converted data which is data generated by converting target data according to one conversion instruction and which is divided into P-number (P is an integer of two or more) of partial data and stored in an external storage device, and wherein each of at least (P−1)-number of partial data of the P-number of partial data has a predetermined data size; and
- providing the converted data stored in the external storage device to the external apparatus in response to each of the plurality of request commands,
- wherein the providing includes:
  - writing one or more untransmitted partial data in an internal storage device of the first server by acquiring the one or more untransmitted partial data as a portion of the P-number of partial data from the external storage device each time when one request command of the plurality of request commands is received, wherein the untransmitted partial data is partial data including a portion, which has not been transmitted yet, of the P-number of partial data, and
  - transmitting at least a portion of the one or more untransmitted partial data written in the internal storage device, to the external apparatus, each time when one request command of the plurality of request commands is received.

* * * * *